D. R. McCAULEY.
LICENSE TAG HOLDER FOR AUTOMOBILES AND OTHER VEHICLES.
APPLICATION FILED JAN. 17, 1912.
1,058,882.
Patented Apr. 15, 1913.
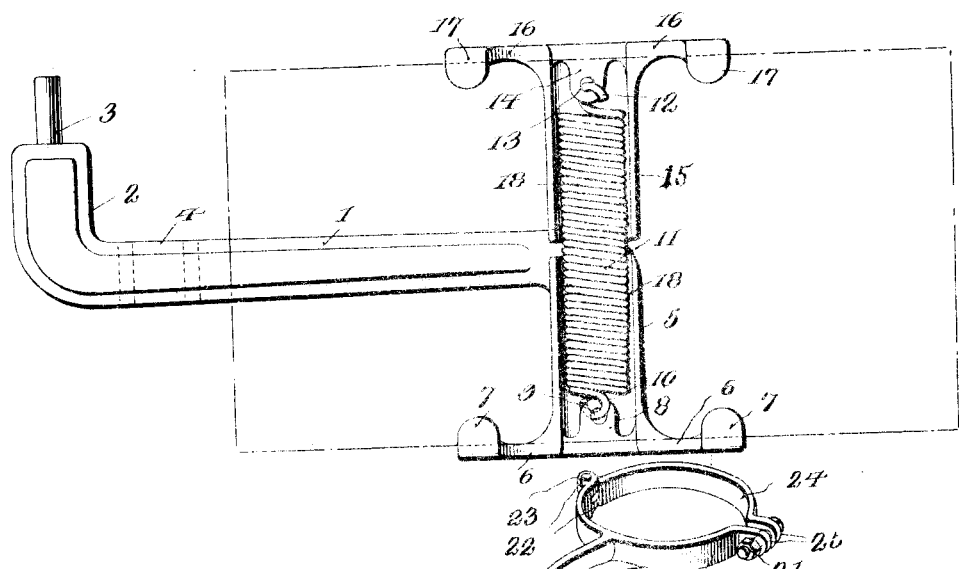
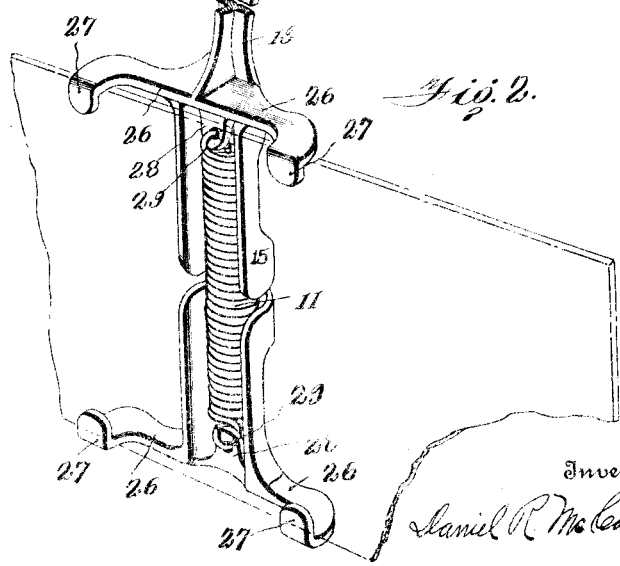
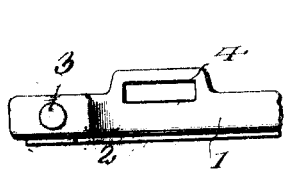
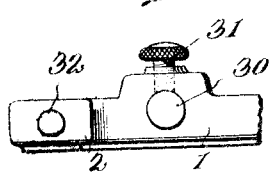
Witnesses
Inventor
Daniel R. McCauley

UNITED STATES PATENT OFFICE.

DANIEL R. McCAULEY, OF WASHINGTON, DISTRICT OF COLUMBIA.

LICENSE-TAG HOLDER FOR AUTOMOBILES AND OTHER VEHICLES.

1,058,882. Specification of Letters Patent. Patented Apr. 15, 1913.

Application filed January 17, 1912. Serial No. 671,617.

*To all whom it may concern:*

Be it known that I, DANIEL R. MCCAULEY, a citizen of the United States, residing at Washington, in the District of Columbia, have invented certain new and useful Improvements in License-Tag Holders for Automobiles and other Vehicles, of which the following is a specification.

This invention relates to improvements in license-tag holders for automobiles and other vehicles.

The object of the invention is to provide a simple and cheap device of this character, and one which may be quickly and conveniently manipulated to grip and hold the license-tag against any possibility of accidental displacement.

A further object of the invention is to provide a holder which may be conveniently attached to a suitable support on the vehicle, either at the front or the rear, and one in which the clamping device is so constructed that it will accommodate two or more tags.

In the drawings—Figure 1 is a face view of the holder; Fig. 2 is a similar view of the holder, showing a modified form of attaching device, whereby said device may be attached to the radiator of the car. Fig. 3 is a broken top edge view of the holder, showing an aperture therein which adapts it for attachment to a flat lamp bracket, and Fig. 4 is a similar view showing a form adapted for attachment to a round lamp bracket.

Referring to the drawings, the numeral 1 designates the main arm of the license-tag holder which, in carrying out my invention, I turn upwardly as indicated at 2 and provide it with a short standard 3 adapted to enter the sleeve of the lamp. I provide an elongated slot in the arm as indicated at 4, by which the device is adapted to be attached to the flat lamp bracket, usually found upon automobiles. The arm 1 is bent downwardly at its opposite end, as indicated at 5, and is provided with laterally extending arms 6 having lips 7 which overlap the lower edge of the tag. Cast preferably integral with the lower part 6 is a tab 8 having an eye 9 therein to receive the hook 10 formed on the lower end of a spiral spring 11 whose upper end is made in the shape of a hook 12 which is received in an eye 13 in a tab 14, integral with the upper member 15 of a clamping device. The clamping device 15 is provided with two laterally extending arms 16, corresponding to the arms 6 and like the arms 6 is provided with two overhanging lips 17 adapted to embrace or overhang the upper edge of the tag. The fixed section of the clamping device, as well as the upper or movable section, is provided with a semi-cylindrical seat 18, in which the upper and lower ends of the spiral spring rest.

In the modification shown in Fig. 2, the upper clamping section may be regarded as the fixed section and to this I provide an upwardly extending arm 19 which is curved backwardly and runs into a semicircular yoke 20 provided at one end with a flange 21 and at the opposite end this yoke is bifurcated as indicated at 22, to receive the stud 23 of the companion piece 24. The piece 24 is provided with a flange similar to the flange 21 and both flanges are perforated for the passage of a screw 25, which arrangement adapts the device for attachment to the radiator filling-tube. In this form the clamping sections are provided with laterally extending arms 26, provided with upturned lips 27 which overlap the edges of the tag and as in the form shown in Fig. 1, these sections are provided with tabs 28 provided with eyes 29 to receive the ends or hooks of the spring 11.

In the form shown in Fig. 4, I provide a round hole 30 which adapts the whole device for attachment to a round lamp bracket and in this form a binding-screw 31 may be provided to prevent the device from turning on the bracket. As in the preferred form, this form of bracket will have a post 32 adapted to receive the lamp.

When it is desired to place a tag in the holder, the upper gripping member is forced upwardly sufficiently to overlap the upper edge of the tag, the lower edge of the tag having first been seated in the lower gripping member. This movement of the upper section is obviously against the influence of the spring 11, which will serve to draw the upper member down with sufficient force to firmly grip the tag. The lips 7 and 17 may be sufficiently off-set from the arms 6 and 16, to provide room for several tags, lying one upon the other, which is a convenient arrangement where only one tag is required to be displayed at a time.

Having thus described my invention, what I claim as new is:—

1. A license tag-holder, comprising two gripping members arranged to grip the upper and lower edges of a plate or tag, and having tag-engaging lips, a spiral spring connecting said members, each member being provided with a vertical extension, the extensions formed to provide a smooth backing for the spring, said spring and extensions forming a backing for the face of the tag, opposed to that engaged by the lips of the gripping members.

2. A license tag-holder, comprising two gripping members provided with tag engaging lips and semicylindrical extensions, a spring connecting said members in operative position, said spring being contained within the semicylindrical extensions, so that a smooth backing will be provided for a substantial portion of each end of the spring, and a practically continuous backing formed by said spring and extensions for the face of the tag opposed to that engaged by the lips of the gripping members, and means for attaching the holder to a vehicle.

In testimony whereof I affix my signature in presence of two witnesses.

DANIEL R. McCAULEY.

Witnesses:
TITIAN W. JOHNSON,
FRANK G. BRENTON.